July 23, 1963

C. M. HANNUM 3,098,333

METHOD OF SHARPENING GEAR CUTTING TOOLS

Filed June 23, 1959

7 Sheets-Sheet 1

INVENTOR.
CHARLES M. HANNUM
BY
Meyer, Baldwin, Doran & Young
ATTORNEYS

July 23, 1963 C. M. HANNUM 3,098,333
METHOD OF SHARPENING GEAR CUTTING TOOLS
Filed June 23, 1959 7 Sheets-Sheet 4

INVENTOR.
CHARLES M. HANNUM
BY
Meyer, Baldwin, Doran & Young
ATTORNEYS

INVENTOR.
CHARLES M. HANNUM

United States Patent Office 3,098,333
Patented July 23, 1963

3,098,333
METHOD OF SHARPENING GEAR CUTTING
TOOLS
Charles M. Hannum, Birmingham, Mich., assignor, by
mesne assignments, to National Cleveland Corporation,
Cleveland, Ohio, a corporation of Ohio
Filed June 23, 1959, Ser. No. 822,329
1 Claim. (Cl. 51—288)

This invention relates to a new and novel method of sharpening gear cutting tools or the like.

The new and novel method of the present invention, as herein shown, is particularly applicable for use in the sharpening gear cutters of the helical type, as is referred to in the art, wherein the cutting teeth of said cutter are disposed in a helical formation around the cutter periphery, and the side edges of said cutting teeth are substantially involute in configuration.

A primary object of the present invention is the provision of a new and novel method for accomplishing the sharpening of gear cutting tools or the like, and which method is operative to accurately locate and positively present certain parts of the cutting tool to sharpening apparatus.

Figure 1:
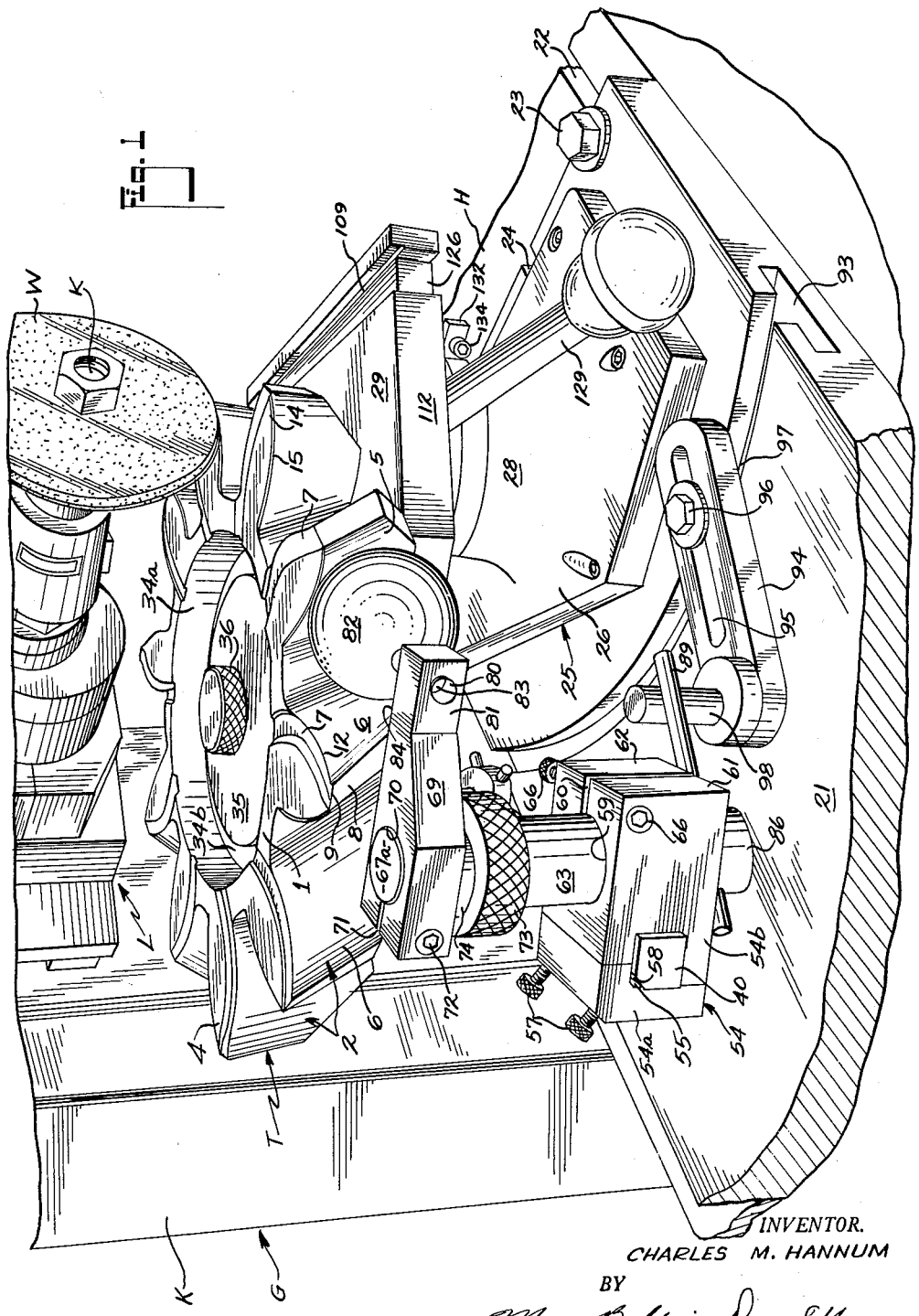
Figure 2:
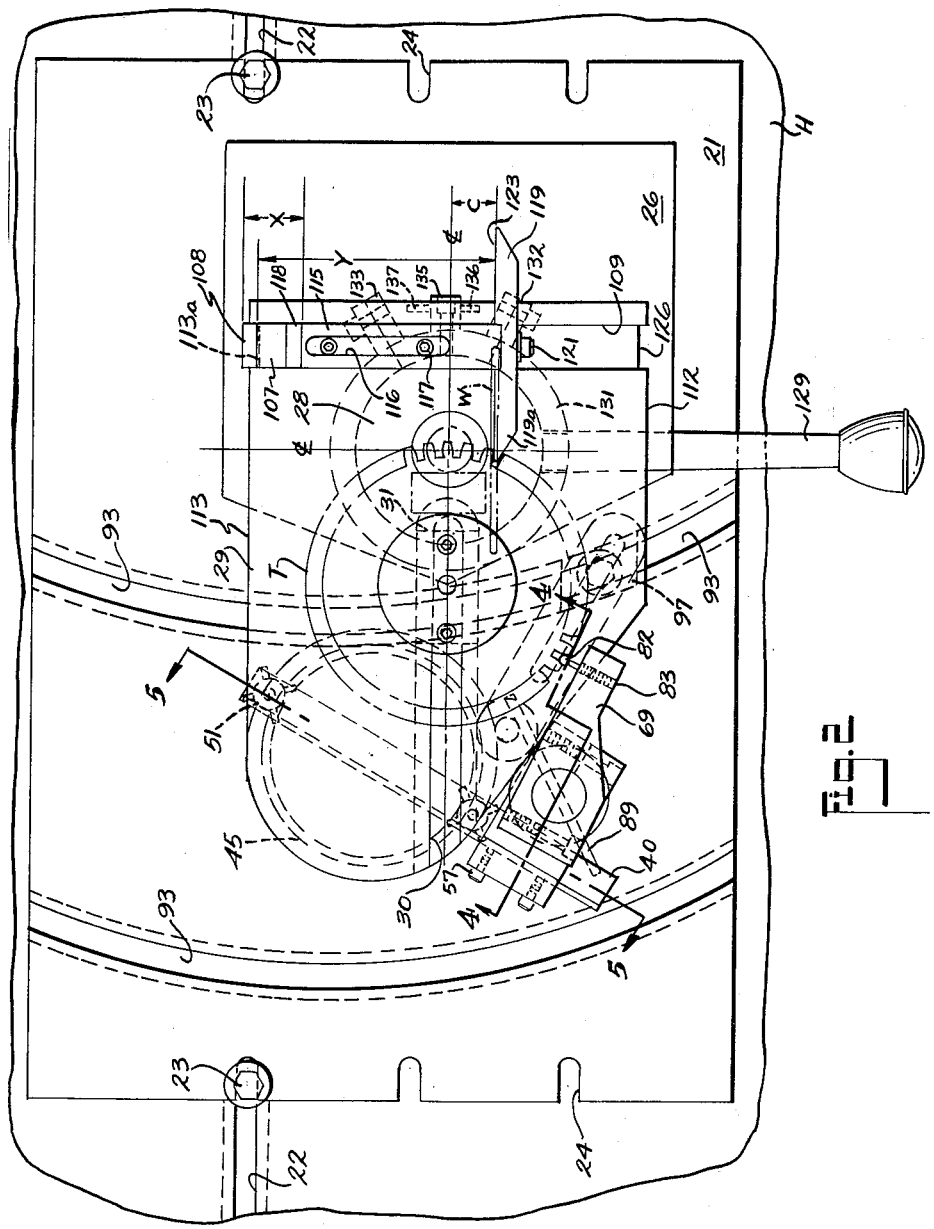
Figure 3:
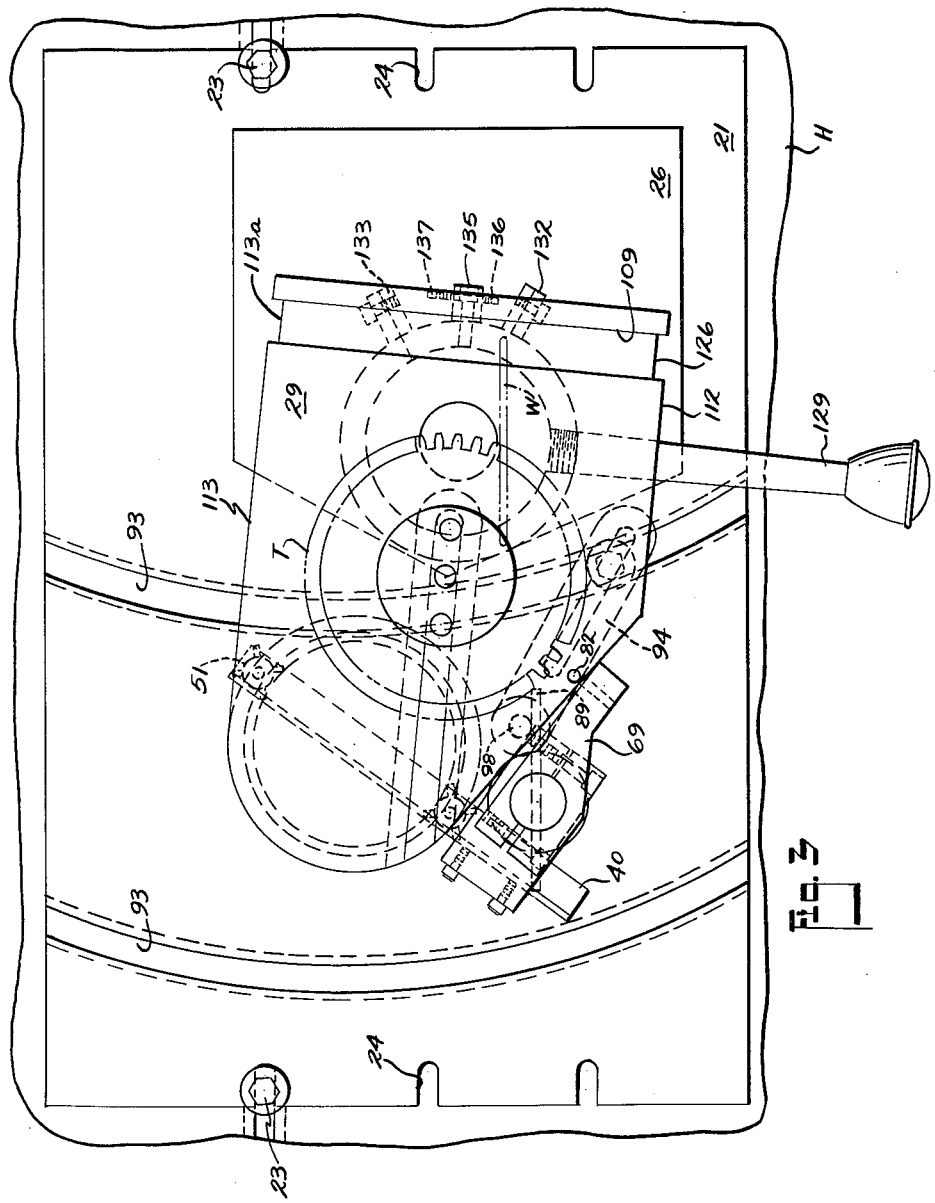
Figure 4:
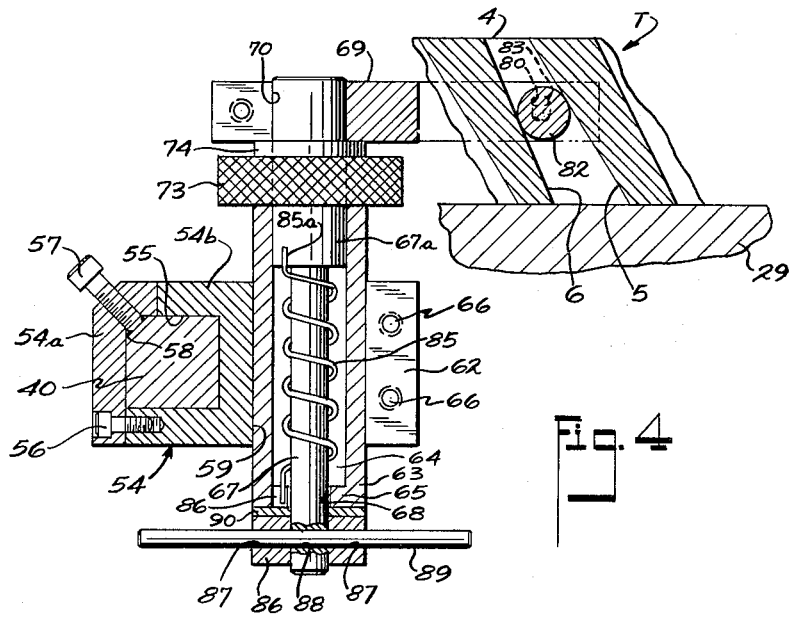
Figure 5:
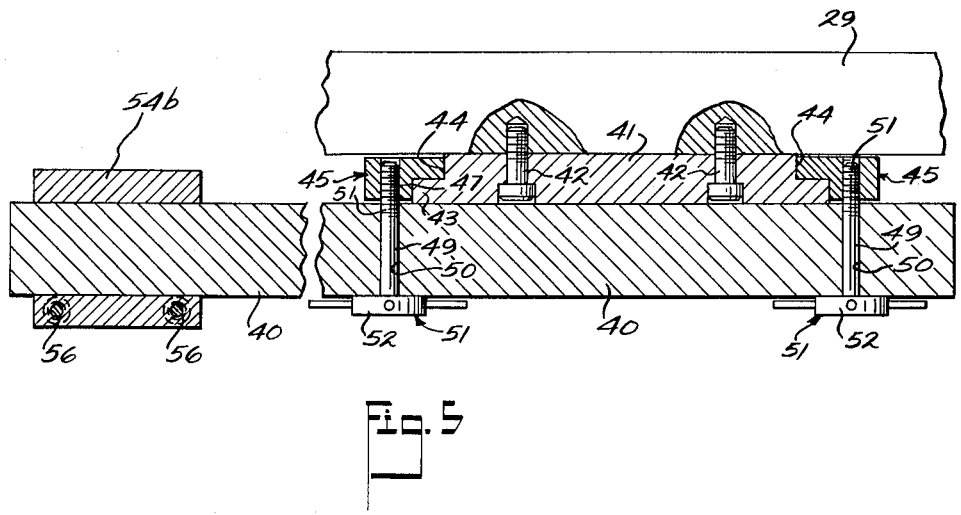
Figure 6:
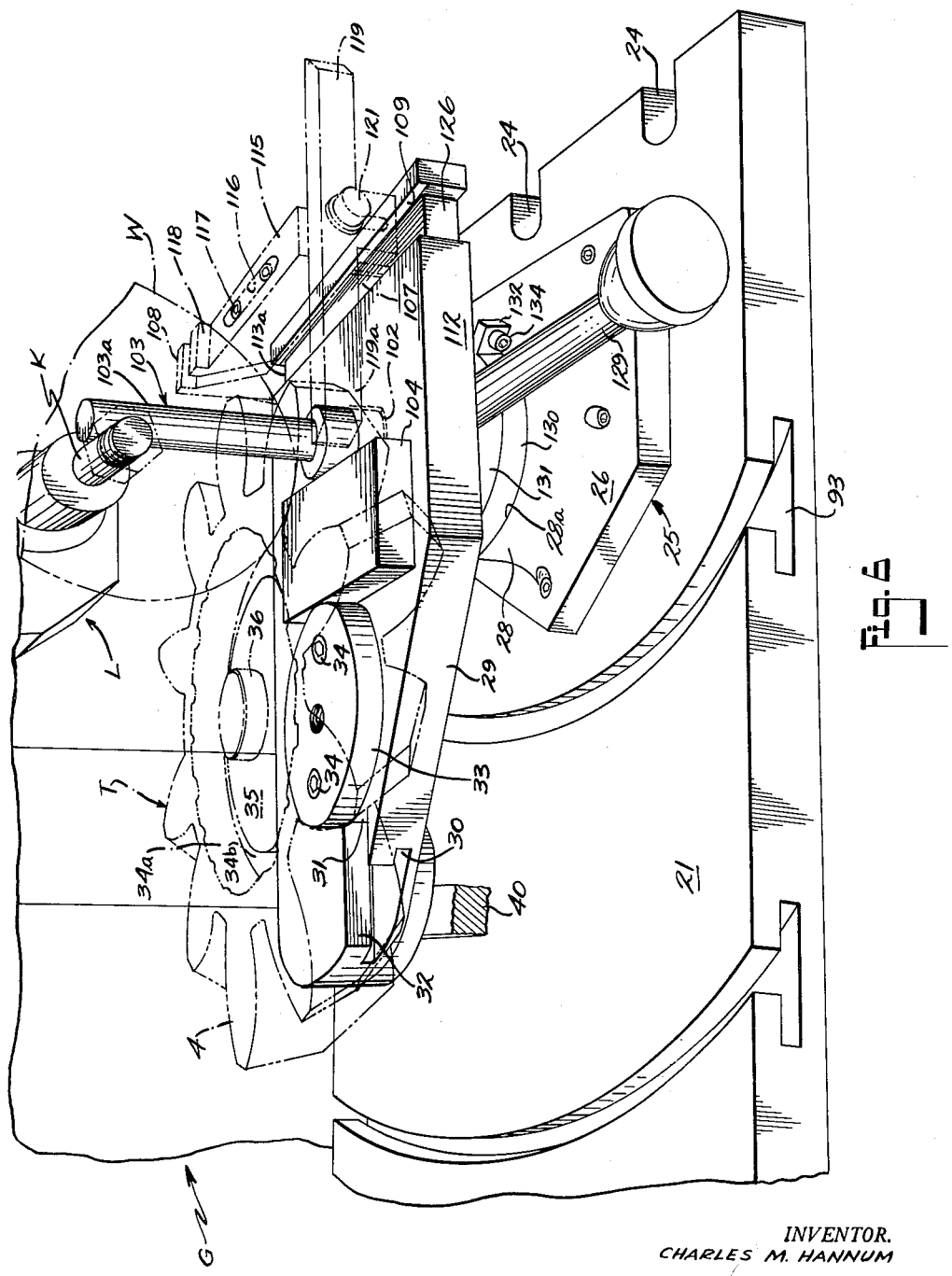
Figure 7:
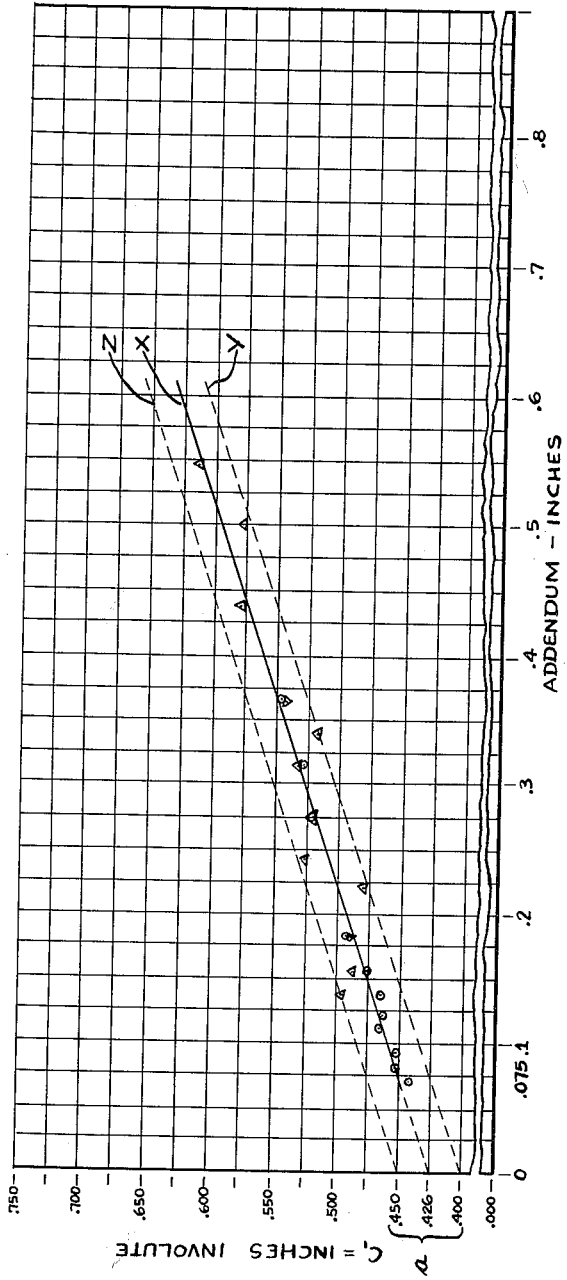
Figure 8:
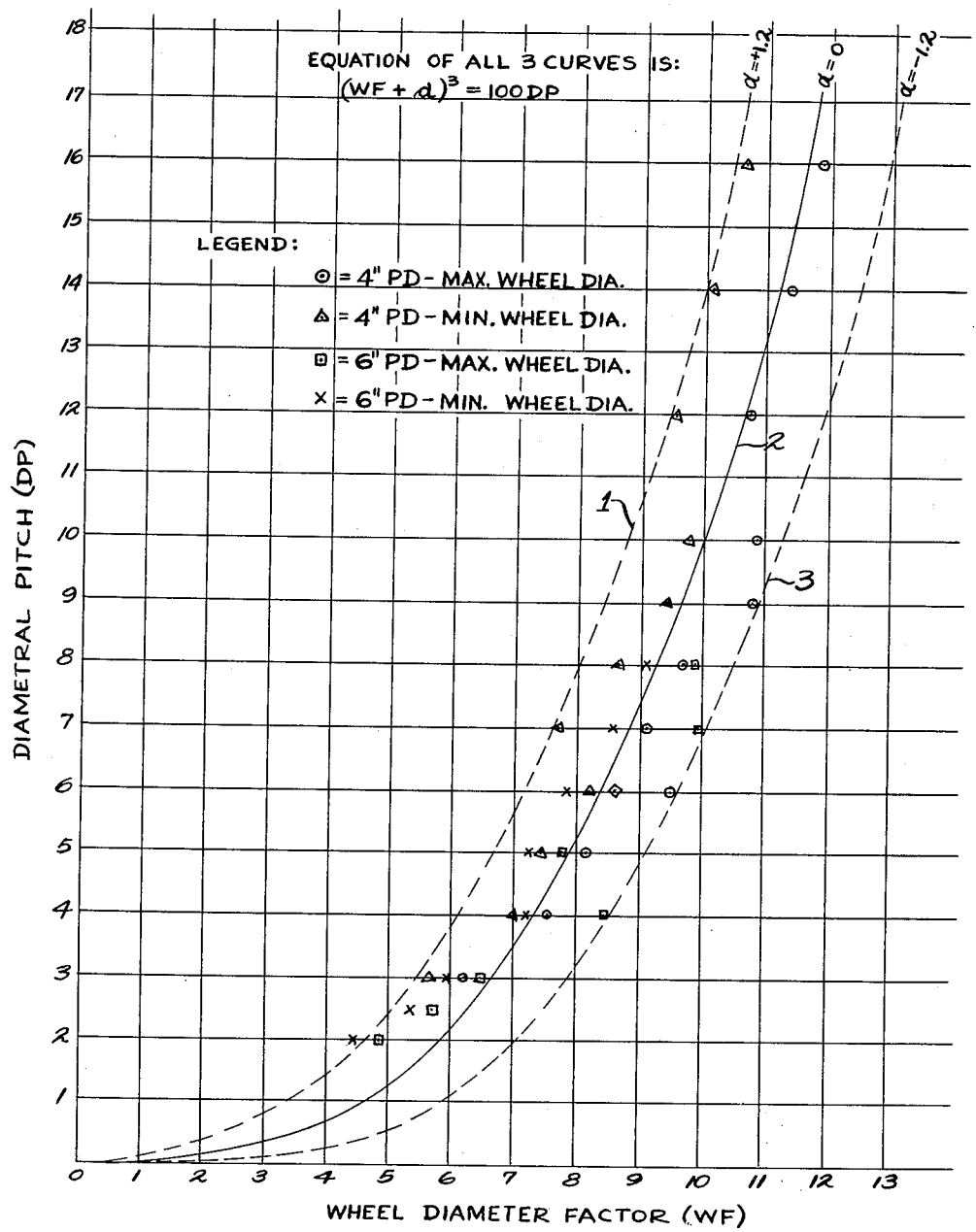

Additional objects and advantages of the novel method of the present invention may be readily ascertainable to one skilled in the art to which the same pertains upon reference to the following disclosure and which is illustrated in the accompanying drawings included as a part of this specification, and wherein:

FIG. 1 is a fragmentary perspective view of a conventional grinding machine upon which is supported a machine tool fixture embodying the concepts of the present invention, with said fixture mounting a cutting tool of the helical type and in the process of sharpening said tool in accordance with the new and novel method of the present invention, with said fixture in a working stroke relative to said grinding machine wherein a cutting edge on one of the cutter teeth is being presented to and hence sharpened by the abrasive grinding wheel;

FIG. 2 is a plan view of the machine tool fixture of the present invention shown being supported on the bedplate of the grinding machine of FIG. 1, said view showing only a part of the aforesaid bedplate, and with said fixture incorporating novel gauging means being selectively positioned in accordance with the method of the present invention as to properly locate a predetermined one of the cutting edges on one of the gear cutter teeth with respect to the abrasive grinding wheel of said machine;

FIG. 3 is a fragmentary plan view somewhat similar to FIG. 2, but showing the machine tool fixture of the present invention at one terminus position with respect to the grinding machine whereat the indexing mechanism is actuated to permit the advancement of the gear cutting tool to thus locate another cutting edge on a successive cutting tooth to a grinding position relative to the abrasive grinding wheel of said machine;

FIG. 4 is a vertical, sectional view of the indexing means taken approximately through the vertical plane indicated by the line 4—4 in FIG. 2; and, FIG. 5 is a vertical sectional view taken approximately through the vertical plane indicated by the line 5—5 in FIG. 2;

FIG. 6 is a fragmentary perspective view of the grinding fixture of the present invention with a helical type cutting tool shown in dotted lines in its proper location relative to the abrasive grinding wheel, and with the several gauging means incorporated with the instant fixture located in their operative positions in accordance with the inventive concepts of the new and novel method disclosed herein and thus functioning to properly locate the cutting edges of each tooth on the aforesaid cutting tool relative to said grinding wheel;

FIG. 7 is a graph showing several cutting tool characteristics as applied to the sharpening method of the present invention; and, FIG. 8 is a graph showing the preferred relationship between several characteristics of the cutting tool and the grinding wheel used to sharpen the cutting teeth thereof.

Before describing in detail the new and improved method and grinding fixture of the present invention for sharpening gear cutting tools, it may be well to briefly described one type of helical gear cutting tool as referred to in the art, for which the instant method and fixture are especially applicable to effect a proper and correct sharpening of said tool.

With reference directed to FIG. 1, a helical type of gear cutting tool is therein shown as is indicated in its entirety by the reference character T, as being somewhat disc-like in configuration and comprising generally a central hub 1 which has a plurality of identically formed cutting teeth 2 integrally formed therewith being equally spaced one from the other and extending around the periphery of said hub in a helical fashion.

The instant type of cutting tool T is normally utilized in matched pairs, to form a herringbone type of gear, wherein one tool of said pair is referred to as a right-hand cutter, the profile of the sides of each of the cutter teeth thereof extending downwardly from the cutting face of the cutting tool body and to the left from the tool axis, and the other cutting tool of said matched pair being referred to as a left-hand cutter wherein the side profile of each of its cutting teeth extends downwardly and to the right from the aforesaid tool axis.

The cutting tool shown in FIG. 1 is therefore seen to be a left-hand cutting tool, wherein the cutting face of said tool is identified by the reference numeral 4 and the profiles of the side faces of each tooth being likewise indicated at 5 and 6 respectively.

The helicoid side face 5 of each of the cutting teeth 2 is seen to intersect the cutting face 4 at an acute angle, the edge as defined at the apex of said intersecting faces being referred to in the art as the "positive" cutting edge of said teeth. In like manner, the helicoid side face 6 of each tooth is seen to intersect the aforesaid cutting face 4 at an obtuse angle, the edge defined thereby at the apex of said intersecting faces being referred to as the "negative" cutting edge. The positive and negative cutting edges are seen to be substantially involute in configuration, the origin of which lies on the base circle for the particular cutting tool as is well understood in the art. As is readily apparent, the aforesaid negative cutting edge is initially relatively blunt, whereas the positive cutting edge is initially relatively sharp. Because of the inequality in the relative effectiveness in the cutting edges of each of the cutter teeth, in their original form, as defined by the aforesaid cutting face and side profiles of said teeth, it has been heretofore suggested that each of said cutter teeth be sharpened in the area of the negative and positive cutting edges to thus enable the same to perform a highly efficient cutting action with substantially equal effectiveness.

One present day process of sharpening a gear cutting tool of this type consists briefly in the provision of placing a groove along the cutting face of each tooth, identified in FIG. 1 herein by the reference numeral 7, and projecting said groove closely adjacent the aforesaid "negative" cutting edge of each tooth preferably from the root of the tooth to a point adjacent the crown of said tooth whereat the depth and width of the groove is gradually reduced such that it merges with the plane of intersection defined by the cutting face 4 and the front or crown face 8 of the cutter tooth, which plane defines a crown cutting edge 9. In this manner there is provided a sharpened negative cutting edge 12 which, with the aforesaid crown cutting edge 9, are substantially continuous cutting surfaces and possess the proper physical characteristics such as rake and clearance for an efficient cutting action.

The aforesaid present day sharpening process also provides for the placement of a substantially flat facet or land 14 along the "positive" cutting edge of each tooth 2, said land being disposed at an angle relative to the aforesaid cutting face 4 in such manner as to provide a sharpened cutting edge as indicated at 15.

One of the most apparent difficulties realized in performing the above described process, among others known in the art, relates to the fact that the contour of the aforesaid cutting edges on each of the cutter teeth is substantially involute. Consequently, with present day sharpening methods and fixtures therefor, the services of a highly skilled technical has been required in order to properly present the aforesaid cutting edges to the sharpening apparatus to thus sharpen said cutting tool. Another distinct disadvantage which is also indicative of the inefficient present day sharpening processes is the fact that although the services of the highly skilled artisan is perhaps utilized, said processes oftentimes require extensive periods of time in order to obtain a satisfactory sharpening of the aforesaid cutting tool; said processes hence becoming very expensive to procure and in some instances considered impractical.

As will be hereafter apparent, the new and novel method and machine tool fixture of the present invention, teaches and embodies a concept of sharpening helical type cutting tools that heretofore was not realized and one that is substantially more efficient than prior art sharpening processes, and, in addition, one that only requires the services of an individual of ordinary skill. As will be hereinafter realized, the tool sharpening concepts as are disclosed herein require only a relatively short period of time in order to properly sharpen a cutting tool of the helical type and hence is substantially inexpensive when compared to present day tool sharpening processes.

As previously mentioned, the new and novel method of the present invention for sharpening gear cutting tools of the helical type is especially applicable for use with a grinding machine which utilizes a rotary type of abrasive grinding wheel rotatably supported in a vertical plane about a substantially horizontal axis.

Specifically, the method of the present invention is especially intended to provide for the proper sharpening of the "negative" cutting edge on each tooth of the cutting tool, as above defined, to thus form a configuration of negative cutting edge such as is disclosed in the Erhardt U.S. Patent 2,258,849 issued on October 14, 1941 wherein a groove of uniform cross-sectional dimension is formed along one helicoid side face of the tooth defined herein as the negative side face to a point adjacent the top or crown of the tooth where the depth and width of the groove is gradually reduced to merge or coincide with the normal line of intersection between the flat end face and the top or crown surface of the two. In this manner there is provided a continuous side cutting edge and a crown or top cutting edge of the tooth which blend or merge one into the other, both of which possess the required rake, relief or clearance for an efficient cutting action.

Although the instant method is basically adaptable to the sharpening of the "negative" cutting edges of the cutting tool, said method and the resultant steps defined thereby may also be readily applicable to provide for the proper sharpening of the "positive" cutting edges of said tool, the particular differences in said method when sharpening the aforesaid "positive" cutter edges being hereinafter more fully described.

More particularly, the instant sharpening method of the present invention for sharpening the "negative" cutting edges of the tool, embodies first, the concept of locating a point, which is to be subsequently referred to as a swivel axis, vertically directly below the horizontal axis of the grinding wheel. Secondly, the method disclosed herein embodies the step of locating and supporting the cutting tool to be sharpened on the grinding machine in such manner that its center lies in a predetermined relation to the aforementioned defined point. Thirdly, the instant sharpening method embodies the step of defining a curve which has an arcuate portion and a non-arcuate portion, the configuration of which is determined by the physical characteristics of the particular cutting tool presently to be sharpened, which curve, when generated about a predetermined center, most closely approximates the contour of the involute negative cutting edge of each cutting tooth of said tool, particularly between the root and the tip of said cutting tooth; and fourth, said method embodies the step of placing said predetermined center on the aforesaid point or swivel axis and thence spacing said swivel axis and center from the grinding wheel along said horizontal axis for said wheel a distance corresponding to the magnitude of the arcuate portion of said curve about the predetermined center to thus locate a particular negative cutting edge on said tool directly below the grinding wheel, which cutting edge may then be sharpened by said wheel when swung about said swivel axis.

To thus practice the above novel method, the magnitude of the radius of the arcuate portion of the curve which most closely approximates the contour of the tooth involute is first determined. For this purpose, reference is directed to the following equation:

$$C_1 = a + .34 \text{ addendum}$$

where $C_1$ is the magnitude of the radius of the arcuate portion of the approximating curve;

$a$ is a constant which has a range of between .400 and .450 inch; and, the addendum refers to the value in inches of the addendum of the cutting tooth to be sharpened.

As a means for quickly determining the radius for the arcuate portion of the approximating curve for any one particular cutting tool, attention is directed to the graph as shown in FIG. 7 which is a pictorial illustration of the solution for said mathematical equation for any size cutting tool.

As shown in FIG. 7, the value of $C_1$ is plotted as the ordinate against a value of addendum as the abscissa; the dimension of $C_1$ being of "unit involute scale" later to be defined, whereas the dimension of the addendum being in inches.

Merely for purposes of the instant disclosure and to thus illustrate the derivation of the above equation, a plurality of 4 and 6 inch cutting tools of variable addendum are selected, but as will be hereinafter realized, the linear solution of the said equation is hence applicable to other tool sizes known in the art, and the magnitude of the radius of the aforesaid approximating curve for any cutting tool may thence be readily determined.

On each of the several tools selected, the curve which most closely approximates the contour of the tooth involute between the root and the tooth tip is determined, said curve having an arcuate portion and a non-arcuate portion.

To thus plot the value of the radius of the aforesaid arcuate portion of each approximating curve against its corresponding addendum, said radius is converted to a corresponding value in a "unit involute scale."

As is known in the art and as is defined in the text entitled, "Involutometry and Trigonometry," by Dr. Werner F. Vogel, a "unit involute" is that involute which has a base circle of a radius of one inch. Therefore, with this basis set forth for the "unit involute" scale, any involute which has a base circle of less or larger radius, can be converted to said scale as being a fraction or multiple thereof, respectively.

In the above selected four and six cutting tools, the base circle is of preselected diameter for each size, namely, 3.7588 inches for the four inch tool, and 5.6381 inches for the six inch tool.

Hence to relate any dimension of a four inch cutting tool to the unit involute scale, said dimension is multiplied by the factor $(1 \div 1.8794)$ or $.53208$; and likewise, for a six inch tool, the dimensions thereof are multiplied by a factor $(1 \div 2.81905)$ or $.35473$.

Having obtained the value in inches of the radius for the arcuate portion of the curve which most closely approximates the involute contour of the cutting teeth on each of the selected four and six inch cutting tools, said radius is thence converted to the unit involute scale using the approximate factors just described.

This radius value, as thus converted, is then graphically plotted against its corresponding value of addendum, said radius being the ordinate and the aforesaid addendum being the abscissa.

For example, with reference to FIG. 7, one of the six inch tools as identified by the symbol △, is seen to have an addendum of approximately .220 inch, and a radius value converted to the "unit involute" scale of approximately .480 inch. In like manner, one of the selected four inch tools, as identified in the graph of FIG. 7 by the symbol ⊙, is seen to have an addendum of a value of approximately .155 inch and a radius value of approximately .475 inch. Other corresponding values for each of the remaining four and six inch cutting tools are also shown in FIG. 7 by the above referred to symbols.

The graph of FIG. 7 as a result of plotting said values of radius versus addendum shows a group of three substantially straight lines X, Y and Z which slope downward to the left, as will now be defined in more detail.

The solid medial line identified as line X refers to a group of those selected cutting tools which were most perfect in their construction; line Y indicates several selected tools whose construction was not as exact as those of the aforesaid group as identified by said line X but within a maximum manufacturing tolerance range as accepted in the art, and line Z in like manner, indicates several selected tools whose construction was not as exact as said medial group X but within a minimum manufacturing tolerance range.

Considering them the line X as the locus and line Y and Z the upper and lower limits therefor respectively, the results as graphically illustrated in FIG. 7 indicate that the unit involute magnitude of the radius of the arcuate portion of the curve approximating the contour of the cutting tool involute as above defined, varies directly, and in a linear fashion, as the addendum of the cutting tool; or in another manner of definition, it may be said that the unit involute magnitude of the radius of said arcuate portion as identified by the reference $C_1$ is a function of the addendum; said relationship being referred to mathematically by the equation: $C_1 = f$ (addendum).

As is also realized upon reference to said graph, it is seen that, for example, upon an increase of one unit on the addendum, (.1 inch), $C_1$ increases by the factor .34, the slope of the lines X, Y or Z. It is therefore apparent that the aforesaid equation then reverts to the following relationship: $C_1 = f$ (addendum) times .34 or $C_1 = .34$ addendum.

With further reference to FIG. 7, it is also realized that as the addendum approaches zero $C_1$ also diminishes in value in a linear fashion. However, $C_1$ does not approach zero, but rather terminates in a finite value at the ordinate. This particular relationship indicates, therefore that with a theoretical zero addendum for the cutting tool, there remains a finite magnitude of $C_1$ to have approximately a value in the aforesaid unit involute scale for line X of .426 inch; line Z of .450 inch; and for line Y of .400 inch.

With this additional relationship established, it may then be determined that the above defined linear relationship between the radius of the arcuate portion of said approximating curve and the addendum as indicated by the equation: $C_1 = .34$ addendum—may be further clarified by stating that with a zero addendum, the radius reduces to a finite value within a range of from .400 to .450 inch the ordinate value of lines Y and Z respectively, having therefore a locus of approximately .426 inch as indicated at the ordinate of line X. Hence, the above equation may then be written as $$C_1 = a + .34 \text{ addendum}$$

where the addendum is defined to be a finite value in inches and $a$ may vary within a range of from .400 to .450 inch, and wherein, if the aforesaid addendum is zero, the second term of said equation becomes zero, and the radius therefore equals the value of $a$ as set forth above.

It will be realized that the value of $C_1$ as determined by the above equation is in "unit involute" scale. Consequently, said value must then be converted by use of the reciprocal of the appropriate multiplying factor, namely, $$\frac{1}{.53208}$$

for the four inch tool and $$\frac{1}{.35473}$$

for the six inch tool, to thus obtain a value of inches for $C_1$ in the English system which is then capable of being applied to a micrometer or the like to properly locate the cutting tool for sharpening of the same as will be hereinafter more fully explained.

As will also be realized, an abrasive grinding wheel of the type referred to herein, wears over a period of time when used in the instant sharpening process thereby requiring that it be re-dressed. As a result of said wearing and subsequent redressing, the diameter of said grinding wheel becomes progressively smaller.

Because of the fact that shop economics demand that grinding wheels be used over an extended period of time thereby requiring that they be dressed from time to time, it becomes necessary to establish a "usable range" of grinding wheel diameters that will produce good results in the instant sharpening process.

To accomplish this and thus determine the preferred wheel diameter for any one size of helical cutting tool, reference is directed to the following equation:

$$\text{Wheel diameter} = WF \left( \text{adden.} + \frac{PD - BCD}{2} \right)$$

where:

Addend.—is the addendum of the cutting tool in inches.
PD—is the pitch diameter in inches.
BCD—is the base circle diameter in inches, and
WF—is a multiplying factor called merely for identification—the wheel diameter factor.

As seen in the aforesaid equation, all of the terms except the wheel diameter factor (WF) relate to the physical dimensions of the cutting tool to be sharpened; i.e., the addendum, pitch diameter and base circle diameter.

To thus obtain a solution to said equation for any one cutting tool and hence the diameter of the grinding wheel to be used fod the sharpening thereof, the Wheel Diameter Factor must also be known.

It has been determined that the Wheel Diameter Factor may be related to any one cutting tool by the following equation:

$$(WF+\alpha)^3 = 100 \, DP$$

where: DP is the diametral pitch and $\alpha$ is a constant having a value within the range $\pm 1.2$.

To quickly determine the value of the wheel diameter factor (WF) for any one particular size of cutting tool, wherein the range of grinding wheel diameter may hence be determined, attention is directed to the graph in FIG. 8, which shows the solution to the above equation $$(WF+\alpha)^3 = 100$$

DP for all sizes of cutting tools.

As shown in FIG. 8, there are three curves identified as curves 1, 2 and 3, the curve 2 signifying the graphical solution of the aforesaid equation for a plurality of selected cutting tools with the constant $\alpha$ equal to zero being the preferred solution, and the curves 1 and 3 likewise being the solution for said equation for said selected cutting tools with the aforesaid constant $\alpha$ equal respectively to +1.2 and −1.2, said latter curves therefore defining upper and lower limits for said derivation.

The value of the constant $\alpha$ of $\pm 1.2$ is selected so as to provide a range of (WF) for any one cutting tool and hence the resultant wheel diameter with which a proper sharpening of said cutting tool may be obtained.

Merely for purposes of disclosure, the selected cutting tools for determining each of the curves 1, 2 and 3 are also four and six inch cutting tools of various characteristics, however it is to be understood that the (WF) factor for other sizes of cutting tools may be readily determined.

The wheel diameter factor (WF) is shown to be plotted as the abscissa against the value of the corresponding DP (diametral pitch) for the selected cutting tool for $\alpha$ equal to zero, and also $\pm 1.2$.

With the factor (WF) thus determined for any one cutting tool having a known DP (diametral pitch), said factor may then be used to determine the proper grinding wheel diameter for said cutting tool by means of the equation $$\text{Wheel Dia.} = WF \left( \text{addendum} + \frac{PD - BCD}{2} \right)$$

For example, for a four inch cutting tool having a diametral pitch of 10, a base circle diameter of 3.7588 inches, and addendum of $$\frac{1.1}{DP}$$

said characteristics being well known in the art for a four inch cutting tool, the above equation for the Wheel Diameter $$WF \left( \text{adden.} + \frac{PD - BCD}{2} \right)$$

reverts to—

$$WF \left( .11 + \frac{4 - 3.7588}{2} \right) = .23 \, WF$$

Thence, from the graph of FIG. 8, with a DP of 10, the preferred value of WF ($\alpha$ equals zero) is 10, and the wheel diameter is therefore .23×10 or 2.3 inches.

In like manner, for a six inch cutting tool having a diametral pitch of 4 and a base circle diameter of 5.6381 inches and addendum of $$\frac{1.1}{DP}$$

the above equation for the wheel diameter reverts to $$WF \left( .275 + \frac{6 - 5.6381}{2} \right) = .456 \, WF$$

Thence, from the graph of FIG. 8, with a DP of 4, the preferred value of WF ($\alpha$ equals zero) is approximately 7.4, and the Wheel Diameter is therefore .456×7.4 or approximately 3.37 inches Having thus determined the radius of the arcuate portion of the said curve, about which that curve may be generated which most closely approximates the involute contour of the cutting edges of the cutter teeth between the root and tip of the aforesaid teeth, and the proper selection of grinding wheel for sharpening the cutting tool, the remaining steps in the instant sharpening method of the present invention as are above defined, may thereafter be readily performed as will be hereinafter more fully described to thus properly sharpen the aforesaid cutting tool.

As one specific example of sharpening apparatus which is readily adaptable to perform the sharpening method as above defined, the present invention also relates to a new and improved sharpening fixture which is particularly adaptable for use with the above referred to grinding machine which utilizes a rotary type of abrasive grinding wheel rotatably supported in a vertical plane about a horizontal axis.

Referring now particularly to FIG. 1 of the application drawings, there is herein shown a conventional grinding machine as indicated in its entirety by the reference character G, and which is provided with a horizontal supporting table H, and a vertically disposed pedestal K, the latter including a grinding head L, having a horizontally disposed spindle K rotatably supporting an abrasive grinding wheel W over the aforesaid table H.

The grinding fixture herein shown embodying the concepts of the present invention is adapted to be fixedly supported on the aforementioned table H of the grinding machine G in such manner as to locate the gear cutting tool T to be sharpened in close proximity to the grinding wheel W.

To accomplish this, said grinding fixture is herein disclosed to include a flat base plate 21 which is adapted to be placed upon the top surface of said machine table. Suitable ways, as identified at 22, may be formed in said table preferably extending longitudinally therealong in parallel spaced relation to each other, and which are each intended to receive suitable anchoring means including a fastener as at 23, the shank of which projects upwardly through a U-shaped slot 24 formed in said fixture base plate, said fastener having an enlarged head extending outwardly beyond said slot and over the upper face of said plate to thus securely fasten the same and hence the hereinafter defined elements of the grinding fixture to the machine table.

As is best seen in FIGS. 1 and 6, the fixture base plate 21 is preferably rectangular in configuration, and rigidly mounts a pedestal housing 25 adjacent its one end. Said housing includes a base support 26 preferably polygonal in configuration and which has an upright cylindrical pedestal 28 integrally formed centrally therewith. The aforesaid upright pedestal 28, rotatably mounts a tool supporting table as is indicated at 29, by any suitable means such as a ball bearing type of mounting well known in the art, said table preferably being swingable on said pedestal about a vertical axis adjacent one end of the aforesaid plate 21 and in a plane raised above the surface of the base plate 21 and substantially parallel thereto.

The tool supporting table 29 includes means to rotatably support the aforementioned gear cutting tool, herein identified at T, and for this purpose said supporting table is provided with a narrow substantially T-shaped guideway 30, which extends therethrough in a radial direction relative to the axis of rotation for said tool supporting table.

A carrier slide-bar 31, preferably of inverted T-shaped configuration, is slidably disposed within the aforesaid guideway 30, the latter being formed as to have an overhanging shoulder 32 on each of its opposed sides and also projecting around its closed end, and which partially overlies said slide-bar and hence operable to slidably capture the same therein. As best seen in FIG. 2, the guideway 30 opens onto the end face of the supporting table 29 remote from the pedestal 28 to thus permit the removal of said slide-bar if so desired.

A disc-shaped plug 33 is fixedly attached to the carrier member 31 by any suitable means such as screws 34, said screws being preferably disposed in countersunk holes formed in said plug and threadedly extendable therein such that the heads of the same are completely within said holes and below the top face of said plug, to thus leave a substantially smooth surface on said top face.

As is well known in the art, a cutting tool of the gear shaper type usually has a bore provided centrally therein which enables said tool to be mounted on a spindle of a gear shaper machine or the like to thus position the same for its intended gear forming operation. As is also known to the artisan, the configuration and dimensional characteristics of said mounting bore have become substantially standardized in the art to thus permit the cutting tool to be used with various kinds of gear shaper machines. At present in the art, at least two diameters of mounting bores are known to be standard for any one given size of gear cutting tool. For example, for a six inch cutting tool, the dimensional reference referring to the pitch diameter of said tool, a three or a three and one-half inch mounting bore may be provided. It is to be understood that still other diameters of mounting bores may be or are already considered standard in the art, the instant examples thereof being merely defined for purposes of disclosure herein.

With the diameter of the bore known, it is hence possible to preselect the dimensional characteristics of the carrier plug 33 such that it may readily accommodate any number of cutting tools which have the same bore diameter but perhaps different diametral pitch and/or pitch diameter.

In the embodiment of grinding fixture herein shown, the gear cutting tool is adapted to be mounted on the carrier plug 33, such that its cutting face 4 lies facing upwardly and is substantially parallel to the top face of the table 29, said plug being extendable into the centrally disposed mounting bore for the same, and of such diameter as to allow said cutting tool to be freely adjustably rotatably movable thereon, for a purpose as will hereinafter be more fully explained. Thus, in order for said cutting tool to be rotatable on the aforesaid carrier plug, the diameter of said plug must necessarily be slightly less than the diameter of the cutting tool mounting bore, but yet of only such dimensional difference as to prevent any tendency of said tool to tilt out of its horizontal plane, once properly mounted on said plug.

The mounting bore for the cutting tool as shown herein is preferably counterbored from the cutting face 4 of said tool as is indicated at 34a, so as to accommodate a cap plate 35. Said cap plate is seen to be larger in diameter than the aforesaid mounting bore and hence overlies the annular shoulder 34b defined at the intersection of said bore and counterbore.

Suitable fastening means such as bolt 36 may be threadedly disposed preferably centrally within said cap member and the aforesaid carried plug 33 to thus capture the cap plate and hence the cutting tool to the table 29. The bolt 36 is tightened only to a degree which permits the cutting tool to be manually substantially freely rotated on the carrier plug 33 as previously mentioned.

As is well known in the art of forming gears, a gear cutting tool such as is herein shown, must be uniformly sharpened on all of its cutting edges if said tool is to eventually produce accurately formed gear teeth. For this reason therefore, the cutting edges along the sides of the cutting teeth of said tool must be ground very carefully. As will be hereinafter more fully described, each of the aforesaid cutting teeth of said tool is preferably successively presented to the grinding wheel several or more times in the sharpening process so that only a small quantity of material need be removed each time.

In following this procedure therefore, it is realized that the cutting tool T must be rotated about its supporting plug 33 at the end of each working stroke of the grinding fixture so as to successively present the aforesaid cutting edges of said cutting teeth to the grinding wheel. It is also realized that in order to obtain optimum sharpening of said cutting teeth, the cutting tool T must be prevented from rotatable movement during the working stroke of the grinding fixture.

To accomplish this, the embodiment of grinding fixture herein shown is provided with a combined index and stop means which in its present form includes an elongated bar 40 carried on the fixture table 29. As is best seen in FIGS. 4 and 5, one end of the bar 40 preferably extends underneath the aforesaid table 29 wherein it is adjustably attached to a disc-shaped plate 41, the latter being securely fastened to the bottom face of said table by means of suitable fasteners such as screws 42. The uppermost part of the plate 41 is of slightly reduced diameter so as to define an annular rim or shoulder 43 on its lower end, said shoulder and adjoining face of the table 29 forming an annular recess 44 therebetween. Said one end of the aforesaid bar 40 is preferably attached to the underside of the plate 41 by means including a circular ring 45. The ring 45 is seen to extend around the annular shoulder 43 of the plate 41 and is provided with a pair of threaded apertures 47. A lock screw 49 is carried within each of a pair of suitable holes 50, spaced longitudinally along the bar 40 and, in turn, is provided with a threaded shank 51 adapted to be threadedly disposed into the aforesaid aperture 47 in the circular lock ring 45. The opposite end of each of said lock screws is also seen to be provided with a spoke-like head 51, the central hub 52 being greater in diameter than the diameter of the hole 50 to thus extend over the undersurface of said bar immediately surrounding said hole.

With this construction, it will be realized that by rotatably adjusting each of said locking screws in the proper direction, the locking ring 45 will be pulled up tight against the aforementioned annular shoulder 43 of the plate 41 to thus securely fasten the bar 40 to said plate. As will also be realized, by loosening the aforesaid locking screws 49, the bar 40 may be rotated about the plate 41 so that its opposite end may project outwardly from the fixture plate 29 in any desired direction. In its present use said bar is preferably attached to the plate 41 so as to project forwardly of the fixture plate 29.

The index and stop means also includes a carrier member 54 formed preferably in two parts 54a and 54b which, when placed one against the other in the manner as shown in FIG. 1, form a cavity 55 extending transversely thereacross and which is intended to slidably receive the aforesaid free end of the bar 40. Suitable fasteners, such as screws 56 as is best seen in FIG. 4 are effective to secure said parts together. Additional screws, as are indicated by the reference numeral 57 in FIG. 1, are threadedly disposed in the carrier part 54a, preferably extending therethrough in a 45 degree plane so as to engage with a flat 58 formed on the bar 40, said flat being likewise disposed in an angular plane which is preferably perpendicular to the axis of said screws.

The carrier member part 54b is centrally provided with a bore 59 which communicates on one side with a slot 60, the latter thereby defining spaced arms 61 and 62 on one end of said part. As best seen in FIGS. 1 and 4, the bore 59 and slot 60 extend through the aforesaid carrier member part 54b in a direction preferably substantially perpendicularly to the axis of the cavity 55.

The carrier member 54 is intended to swingably support an index arm assembly, and to accomplish this, an elongated barrel 63 is disposed in the carrier member bore 59, being adjustably secured therein by means of suitable fasteners 66 threadedly carried in aligned apertures in the arms 61 and 62 of said carrier member. With this construction, the aforesaid barrel 63 may be selectively positioned vertically within the bore 59 and secured thereat by said fasteners for a purpose as will be hereinafter apparent.

The barrel 63 is formed with a chamber 64 which extends longitudinally centrally therethrough, and which is closed at its lower end by means of wall 65.

A shaft 67 is rotatably mounted in the barrel 63, extending preferably centrally through the barrel chamber 64 with its one end freely extending through an aperture 68 formed in the aforesaid end wall 65. The opposite end of said shaft, as best seen in FIG. 4, is somewhat larger in diameter as is indicated at 67a, preferably being of such dimension as to closely slidably interfit the wall of the barrel chamber 64 adjacent its open end.

The end extremity of the enlarged shaft part 67a is seen to mount an index arm 69, said arm preferably having a suitable bore 70 closely adjacent its one end which receives said shaft part in such manner as to rest upon an enlarged rim portion 74. As best seen in FIG. 1, said index arm 69 is bifurcated as is indicated at 71 such that a suitable fastener 72 is effective to draw the opposed parts of said bifurcated portion together to thus bind said arm to the aforesaid end extremity of said shaft.

The shaft 67 is also provided with a knurled adjusting portion 73 which is seen to project outwardly over the upper end of the barrel 63 as seen in FIG. 4, said adjusting portion being operable to provide the means for rotatably adjusting the aforesaid shaft 67 for a purpose to be later described in more detail.

The free end of the index arm 69, as is best seen in FIGS. 1 and 4, is provided with an internally threaded aperture 80 which extends preferably transversely across said arm, and which, in addition, inclines slightly downwardly from the arm face 81.

An index ball 82 is seen to be rigidly mounted on one end of a stub shaft 83, whereas the opposite end of said shaft is threadedly received within the aforementioned aperture 80 in the index arm 69. The index ball is carried on said stub shaft so as to be spaced forwardly of the face 84 of the aforesaid index arm 69. With this construction, said index ball is intended to be disposed between adjacent teeth on the cutting tool T in the manner as is shown in FIG. 1, so as to engage with the adjoining surfaces of said teeth to thereby prevent said cutting tool from being rotated in either direction on its supporting plug 33. The size of the index ball as utilized herein is therefore dependent upon the size and configuration of cutting tool T to be sharpened. Hence, in order to properly sharpen various sizes of cutting tools T, a plurality of different sizes of index balls are provided with the index and stop means of the instant fixture, each of which is especially designed for use with a particular size of cutting tool.

With the aforesaid aperture 80 thus inclined, the index ball is therefore located lower in the space between adjacent teeth than would otherwise be possible with the said aperture disposed in a horizontal plane. In this manner said index ball may be disposed in its lowermost effective position to permit the exact indexing and positioning of a thin cutting tool.

The index arm 69 and ball 82 carried thereon are intended to be biased toward the cutting tool T so that said ball engages with the aforementioned adjoining surfaces of adjacent cutting teeth of said tool. For this purpose, as is best seen in FIG. 4, a coil spring 85 is placed over the part of the shaft 67 disposed within the aforementioned barrel chamber 64 and has its one end, as indicated at 85a, secured to the enlarged diametrical part 67a of said shaft. The opposite end of the coil spring 85 is disposed within a suitable aperture 86 formed in the barrel end wall 65. With this construction, it is hence realized that by rotating the shaft 67 counterclockwise, as is viewed in FIGS. 1 and 4, by means of the aforementioned adjusting knob 73, the spring 85 will be further coiled to thus provide additional biasing action on the index arm 69 and thereby force the index ball into greater pressure engagement with the adjoining surfaces of said adjacent cutting teeth.

As is previously mentioned, the index and stop means is intended to be operative to provide a preselective rotational adjustment to the cutting tool T to thus accurately locate the cutting edges of said tool to be sharpened relative to the grinding wheel.

With reference now directed particularly to FIG. 4, it will be recalled that the cutting teeth of said cutting tool T are disposed in a helical fashion around the tool periphery. Thus, with the index ball 82 disposed between adjacent teeth and engaging the surfaces thereof, any upward or downward vertical adjustment of said index ball will be effective to proportionally rotate the cutting tool on its supporting plug 33. To obtain said vertical movement for the index ball 82, the fasteners 66 on the carrier member 54, are loosened sufficiently to permit the barrel 63 to be moved vertically in the desired direction within the bore 59 whereby the index arm and said index ball carried thereby are moved with the same to result in rotating the aforesaid cutting tool T. As is also previously described, the threaded aperture 80 is preferably inclined such that its axis lies in a direction facing the fixture plate 29. In this manner, when for instance a cutting tool T is to be sharpened that is at or near the end of its useful life period, i.e., its thickness is at the minimum value recommended in the industry, the index ball 82 may be properly located between and engaging adjacent cutting teeth without fear of grounding the index arm 81 against the top face of the table 29.

As is also previously mentioned, it is intended that at the end of a working or sharpening stroke of the instant fixture table 29, the index and stop assembly as herein shown, is preferably automatically indexed so as to remove the index ball 82 from between adjacent teeth to thus permit said tool to be rotatably adjusted and thereby position the next successive cutting tooth in a sharpening position.

For this purpose, as is best seen in FIGS. 1 and 4, the lower end of the shaft 67 projects through the end wall 65 of the barrel 63 and mounts a cap member 86. Said cap member is, in addition, provided with diametrically opposed holes 87 which align with a hole 88 in the aforesaid shaft and through which are extended a rod 89. Said rod is preferably of such size as to be freely slidable within said aligned holes so as to locate any desired portion thereof exteriorly of and on either side of said cap member.

A spacer disc 90 may be mounted over the end of the shaft 67 between the barrel end wall 65 and the aforesaid cap member 86 being effective to prevent said components from binding one against the other.

By applying a force against the exteriorly projecting part of the rod 89, in the proper direction, the shaft 67 will be rotated so as to swing the index arm 69 and index ball 82 carried thereby free of the cutting tool T. And, as is previously mentioned, the swingable actuation of the index arm is intended to take place at the end of each working or sharpening stroke of the fixture.

For this purpose and as is best seen in FIG. 1, the fixture base plate 21 is provided with an inverted T-shaped groove 93 which is spaced to the left of the fixture pedestal 28 and extends around the latter in an arcuate path through said plate.

An oval-shaped plate 94 having a slot 95 formed centrally therein is adjustably mounted on the fixture base plate 21 by means of a fastener 96 extending through said slot and threadedly disposed in a suitable anchor member as indicated at 97 in FIG. 2. A finger 98 is seen to be rigidly attached to one end of the aforesaid plate 94, and to extend vertically upwardly from the top face thereof.

The plate 94 is located on the fixture base plate 21 so that the finger 98 is positioned to engage the aforementioned rod 89 on the shaft 67 at the end of the sharpening stroke of the said fixture table 29. Thereafter, by continuing to swing said table in the same direction, said engaging fixture components are effective to cause the rotation of the shaft 67 and thereby swing the index arm 69 and index ball 82 free of the cutting tool T.

As is now readily apparent, the several components of the instant fixture structure as just described, are required to be accurately located one to the other and to the abrasive grinding wheel of the machine G in order to properly sharpen various sizes and configurations of cutting tools T in accordance with the sharpening process of the present invention as above described.

For this purpose, the fixture embodiment herein shown incorporates the use of novel gauge means, now to be described, which function to quickly and accurately locate the several adjustable components of the aforesaid fixture relative to said abrasive grinding wheel such that a relatively unskilled operator may perform the necessary procedural setup steps to thus ready the fixture for its sharpening function in a minimum period of time.

More specifically, as is previously mentioned, the instant process embodies the step of locating the vertical swingable axis of the fixture directly vertically below the horizontal axis of the abrasive grinding wheel.

To accomplish this, and with particular reference now directed to FIG. 6, the fixture supporting table 29 is seen to be provided on its upper face with a cavity 102, the center of which lies on the vertical swingable axis of the aforesaid table. The diameter of said cavity may be of any desired dimension, but for the instant fixture embodiment is preferably of such size as to slidably accommodate one end of a one-inch bar gauge, as is indicated by the reference numeral 103. Said bar gauge is adapted to extend vertically upwardly of said supporting table 29 and is preferably formed with an upper portion of reduced diameter having a dimension of one-half inch, as is indicated at 103a.

With the bar gauge disposed in said cavity, suitable adjustment means, not herein shown, are usually provided in the conventional grinding machine for incrementally moving its supporting table H and/or grinding head G transversely, longitudinally and vertically of the machine bed, and are thence utilized to position the fixture supporting table 29 such that the upper part of the bar gauge 103 lies to one side of the grinding wheel spindle K and lightly touches the surface of said spindle adjacent its forward end which is shown to be of reduced diameter. In the embodiment of grinding machine G, herein shown, the aforesaid end of the spindle is purposely constructed to have a diameter of one-half inch, for the following reason.

With the bar gauge positioned in the manner just described, and with said gauge and spindle end having the aforementioned dimensional relationship (one-half inch) as is set forth hereinabove, it will be realized that the vertical axis of the supporting table 29 is offset one-half inch to one side of the spindle axis of the grinding head. For example, as seen in FIG. 6, the bar gauge is disposed to the right of the grinding wheel spindle thus positioning the vertical axis of said fixture table to the right of said spindle axis.

The aforementioned adjustment means are thereafter incrementally adjusted so as to move the fixture supporting table 29 and hence the aforesaid vertical axis for the same exactly one-half inch longitudinally to the left along the bed for said machine. In this manner, the aforesaid axis for the fixture supporting table 29 is thus accurately located in its intended position, i.e., directly vertically below the grinding wheel spindle axis. Suitable conventional lock means (not herein shown) for the grinding machine table H may then be utilized to lock the latter in its adjusted position and hence said fixture supporting table.

With the vertical swingable axis of the fixture supporting table 29 and the axis of the grinding wheel spindle thus related, the proper location for the carrier plug 33 in its supporting guideway 30 is next to be determined. As previously mentioned, the sharpening method of the present invention also embodies the step of locating the center of the cutting tool T to be sharpened in a predetermined spaced relation to the swingable axis of the supporting table 29. To accomplish this, a gauge block as is identified by the reference numeral 104 is utilized. Specifically, said cutting tool center is located radially from the aforesaid axis at a distance determined by the equation $D=yBCR$; where $y$ is a constant having a range between .9 and 1.1; and BCR is the base circle radius in inches of the cutting tool. Knowing the dimensional characteristics of the cutting tool T to be sharpened, the diameter of the aforesaid plug 33 and the bar gauge 103 being also previously known, the size of the aforesaid gauge block 104 sufficient to locate the center of the cutting tool from the aforesaid swivel axis of the fixture table 29, a distance as is determined by the aforesaid equation, may hence be readily ascertained. With the selection of the proper gauge block 104, it is then placed flat upon the upper face of the supporting table 29 between the bar gauge 103 and the aforesaid carrier plug 33 in such manner that its longitudinal axis is perpendicular to the longitudinal axis of the guideway 30. Said plug and its supporting slide bar 31 are thereafter moved along the guideway 30 until the gauge block 104 is in engagement with the aforesaid bar gauge and carrier plug. The screws 34 connecting said plug to its slide bar may then be drawn up to securely fasten said plug in its adjusted position.

With the carrier plug 33 thus located, the cutting tool T to be sharpened is then mounted on the aforesaid plug and secured thereto by the cap plate 35 in the manner previously described, thereby locating the center of said tool at a distance radially from the aforesaid swivel axis as determined by said latter equation.

With said cutting tool T thus disposed on the carrier plug 33, the unsharpened cutting edges on said tool, in accordance with the sharpening method of the present invention, are then located relative to the abrasive grinding wheel W, such that when they are sequentially presented to said wheel and swung about the aforementioned vertical swingable axis of the fixture table 29, said cutting edges will be carried through an arc which most closely approximates the involute contour thereof and will hence be sharpened by said wheel.

As is previously mentioned, in order to obtain an optimum sharpening of the aforesaid cutting edges on the tool T, all of the unsharpened cutting edges formed on the same side of said cutting teeth, i.e., the negative side or positive side, are preferably sequentially presented to the grinding wheel.

With this requirement therefore, either a negative or positive cutting edge on one cutting tooth may then be properly located in the above manner, and the cutting tool may then be thereafter rotatably indexed at the end of each sharpening stroke of the fixture table to thus present the next successive cutting edge on the same side of the next tooth to said wheel.

For example, in the left-hand cutting tool T shown in FIGS. 1 and 6, the positive cutting edge of one of the aforesaid cutting teeth is shown to be in position to be sharpened by the abrasive grinding wheel W. At the conclusion of the sharpening stroke of said fixture, said cutting tool will be rotated in a counterclockwise direction to thus present the positive cutting edge on the next successive cutting tooth to said wheel.

Usually, after all positive cutting edges have been properly sharpened, the negative cutting edges of said tool will thence be accurately located with respect to said grinding wheel W, and thereafter sharpened in substantially the same manner. However, as is also previously mentioned, the positive cutting edge is provided with a substantially flat facet 14 whereas the negative cutting edge is provided with a groove 7. It may also be preferred to sharpen all of the negative cutting edges first and thence the positive cutting edges, the instant process, as above mentioned, being applicable to both the negative and positive cutting edges.

Merely for purposes of disclosure, the manner in which the aforementioned unsharpened positive cutting edge on each cutting tooth is accurately located with respect to said grinding wheel will be now described in detail, any differences in said operation which are particularly applicable to locating the negative cutting edge on each tooth with respect to said wheel, being also hereinafter mentioned.

Referring now particularly to FIG. 6, the instant fixture embodiment incorporates additional gauge means which selectively utilizes one of the edges of the fixture supporting table 29 as a reference plane and thence is adapted to accurately locate each of the aforesaid cutting edges of said tool, in the present instance, the positive cutting edges, and also the grinding wheel to said plane in such manner as to locate the vertical swingable axis of the fixture supporting table 29 a distance from the aforesaid abrasive grinding wheel equal to $C_1$, as previously determined by the equation $C_1 = a + .34$ addendum.

More specifically, the gauge means in its present form is seen to be somewhat T-shaped in overall configuration and having a base leg 107 integrally formed on its one end with a pair of arm members 108, only one of which is shown and which arms project perpendicularly outwardly from said end of the leg member in opposite directions one to the other. The base leg 107 is seen to be of such dimensions as to be slidably accommodated in a groove 109 formed in the fixture table 29 preferably closely adjacent one end thereof and extending perpendicular to the front and rear edges thereof as indicated at 112 and 113, respectively.

To properly locate the aforesaid positive cutting edges on said cutting teeth and grinding wheel W at said value $C_1$ relative to the swivel arms of said fixture table 29 said base leg is placed in the aforesaid groove such that the arms 108 are disposed in a vertical plane with the surface of the lowermost arm 108 adjacent said base leg adapted to lie flat against a recessed edge portion 113a of the fixture plate edge 113 formed at the rearward end of said groove.

The T-gauge structure also includes an adjustable leg 115 slidably carried on the top surface of the aforesaid base leg 107 and which has an elongated slot 116 formed centrally therein and accommodating suitable fasteners 117, the latter being threadedly extendable into said base leg to thus secure said members together.

The end of the adjustable leg 115 adjacent the arm members 108 is integrally formed with an upstanding foot 118. The opposite end of said adjustable leg mounts a head element as is indicated at 119. As is best seen in FIGS. 2 and 6, the head element is rigidly attached to the adjustable leg by means of a suitable fastener 121 such that it extends perpendicularly transversely outwardly from the longitudinal axis of said leg whereby the left-hand side 119a thereof extends over the fixture table 29 and toward the aforementioned tool mounting plug 33. The head element 119 is provided with a suitably flat ground surface 123 facing the adjustable leg 115 and which lies substantially in a vertical plane parallel to the vertical swingable axis of said fixture table.

The instant gauge structure is intended to be accurately adjusted in its present use for locating the cutting edges at said value $C_1$ relative to the aforesaid swingable axis.

To accomplish this, the T-gauge device is purposely constructed to have predetermined physical dimensions such that with a particular cutting tool T having previously been selected to be sharpened, and the value of $C_1$ having been determined, a corresponding micrometer measurement between the rearward face of the upper arm member 108 and the forward face of the foot member 118, as indicated by the reference "X" in FIG. 2, the aforesaid surface 123 of the gauge head element 119 is disposed forwardly of the recessed edge portion 113a of the rear fixture plate edge 113 a distance corresponding to the reference character "Y." With this relationship established, the aforesaid gauge head surface 123 is disposed forwardly of the vertical swingable axis of the fixture table 29, a distance C.

With the T-gauge thus adjusted, the cutting tool T to be sharpened is then mounted on the plug 33 with its cutting face 4 disposed in an upwardly facing horizontal plane. Said cutting tool is then rotated on said plug 33 until the extremity of the left-hand portion of the head surface 123 is in true tangential contact with the involute flank on the positive cutting edge on one of the cutting teeth of said tool.

With the cutting tool T thus positioned, the previously described index and stop assembly is brought into engagement with said tool to thereby retain said prepositioned cutting edge in its proper location.

The T-gauge is then retained in its position on the fixture table 29, and the machine table H is thence moved by the aforementioned adjustment means until said surface extremity on said gauge head engages with a preselected point on the periphery of the grinding wheel W. As will be realized, to form the facet on the positive cutting edge of each cutting tooth, the grinding wheel must be provided with a suitable corresponding angular surface, as seen in FIG. 1. Hence, by selecting a particular part of the grinding wheel surface, the facet may be formed of any predetermined surface configuration; for example said surface may be flat as preferred herein, or concave or convex.

As previously indicated, the proper size of grinding wheel W for the particular size of cutting tool being sharpened is determined by the equation $$\text{Wheel dia.} = WF \left( \text{adden.} + \frac{PD - BCD}{2} \right)$$

With the cutting tool T and the selected grinding wheel W thus accurately located relative to the vertical swingable axis of the fixture table 29, the T-gauge is then removed from said table. Thereafter, the fixture is ready to be swung about its swingable axis to thus present the positive cutting edges to said grinding wheel for sharpening thereby.

For sharpening the negative cutting edges of the cutting tool so as to form a groove 7 along its contour, the T-gauge is disposed in the groove 109 such that the lower arm member 108 is disposed within a recessed edge portion 126 formed at the forward end of the aforesaid groove.

In this manner, the gauge head element 119 is located rearwardly of the swingable axis of the fixture table 29, as seen in FIG. 2, and the gauge surface 123 is thus located at a distance "$C_1$" also rearwardly of said axis, corresponding to the aforesaid equation $C_1 = a + .34$ addendum.

The left-hand portion of said surface is then brought into true tangential contact with the involute flank on the negative cutting edge on one of the cutting teeth of said tool, the index and stop assembly is thereafter brought into its operative position between adjacent cutting teeth of said tool in the manner previously described.

The grinding machine table H is next moved by the aforementioned adjustment means until the surface extremity on said left-hand portion of the gauge head engages with a preselected point on the grinding wheel W. For sharpening the negative cutting edges of the cutting tool T wherein the aforesaid groove 7 is formed along the involute contour of the cutting teeth, the selected grinding wheel W has the proper contour of grinding surface so as to form the desired configuration of groove.

As best seen in FIG. 1, the facet 14 on the positive cutting edge is formed along substantially the complete length of the positive cutting edge on each cutting tooth passing through the tip of said tooth, whereas on the negative cutting edge of each tooth, the groove 7 is preferably formed such that its depth is reduced as it approaches the tooth tip so as to merge with the surface of the aforesaid tip therefore not passing through said tip.

To obtain the proper configuration for the aforesaid facet 14, the fixture table 29 is positioned such that at the beginning of each sharpening stroke the grinding wheel W is disposed adjacent the tip of the cutting tooth to be sharpened and outwardly of the tool periphery. The table is thereafter swung counterclockwise about its vertical swingable axis to form said facet beginning at said tooth tip and being generated toward the axis of said tool. Said table is preferably provided with a handle as seen at 129 to facilitate the swinging of said table.

Likewise, to properly form the groove 7, said fixture table is positioned such that at the beginning of each sharpening stroke, the grinding wheel W is located within the periphery of the tool counterbore 34a. The table 29 is thereafter also swung counterclockwise about said axis, said groove being thereby generated from the innermost part of each tooth toward the tip thereof. As previously explained, the grinding wheel W is prevented from passing through the aforesaid tip.

To accomplish this the instant fixture structure includes a pair of split collars 130 and 131 mounted one on top of the other as best seen in FIG. 6 and encircling the fixture pedestal 28, being preferably disposed within an annular recess 28a on the latter. The ends of each of said collars 130 and 131 are provided with outwardly projecting tongue members 132 and 133, respectively, which threadedly receive a suitable fastener as indicated at 134 which is operative to bind each collar to said pedestal such that the associated tongues thereof are disposed and project outwardly from the periphery of said pedestal.

The fixture table 29 is preferably integrally formed with a lug member 135 which mounts a pair of screws 136 and 137. In the instant fixture structure, and with a proper swingable actuation of the table 29, the screw 136 is intended to be disposed in a plane so as to engage with the tongue members 132 on the collar 130, whereas the screw 137 is positioned to be similarly engageable with the tongue members 133 on the collar 131.

With this construction, it is now realized that by properly locating the aforesaid collars 130 and 131 and hence the tongue members 132 and 133 carried thereby, the length of arc through which the fixture table 29 is swung may be preselected so as to present only the desired portions of the cutting edges on each cutting tooth to the grinding wheel W. For example, in sharpening the positive cutting edges on the left-hand cutting tool T, as is best seen in FIG. 2, the collar 130 may be selectively located about the pedestal 28 thus disposing the tongue members 132 thereon in such position as to intercept the screw 136 to thus stop the swingable movement of the fixture table at approximately the instant the root of the cutting tooth being sharpened is passed under said wheel.

In like manner, the collar 131 may be selectively disposed on said pedestal 28 so as to locate the tongue members 133 thereon in position to engage with the screw 137 at the end of each sharpening stroke of the fixture table 29 wherein the cutting tool T is swung free of said grinding wheel W to thus limit the length of arc through which said table is swung on the return actuation of each sharpening stroke.

It will also now be realized that when the negative cutting edges of the left-hand cutting tool T are to be sharpened, wherein the grinding wheel W is disposed within the periphery of the counterbore 34a of said cutting tool at the beginning of each sharpening stroke of said fixture table, the aforesaid collar 131 is disposed on its supporting pedestal 28 to thus locate the tongue members 133 thereon so as to engage with the screw 137 in response to a counterclockwise swingable movement of the fixture table 29 at the instant the surface of the grinding wheel W merges with the surface of the tooth tip without passing through the latter.

Likewise, on the return clockwise actuation of the fixture table 29 to relocate the grinding wheel W within the periphery of the tool counterbore 34a, as above mentioned, the collar 130 is also preferably located to thus position the tongue members 132 thereon so as to engage with the screw 136, being effective thereby to stop the swing of said table when the grinding wheel W enters into the aforesaid tool counterbore.

As will now be further realized, when a right-hand cutting tool T is to be sharpened by the instant fixture structure, wherein the positive and negative cutting edges on said tool are located on opposite sides of said teeth as compared with the aforesaid left-hand cutting tool T, the above described process of locating said cutting edges is reversed to that utilized for said left-hand cutting tool. For example, to properly locate the positive cutting edges on said right-hand tool relative to the axis of the fixture table with the aforementioned T-gauge, said gauge uses the surface of the recessed portion 126 on the front edge 112 of the fixture table. And, to thus locate the negative cutting edges of said right-hand tool to said table axis, the surface of the rearwardly disposed recess portion 113a is therefore utilized. In addition, with the aforesaid cutting edges of said right-hand tool being located in a reverse manner with respect to the left-hand tool T, the latter being shown in the drawings, the fixture table 29 is swung in a clockwise direction as viewed in FIG. 2 to thus properly present said cutting edges to the grinding wheel W.

Having thus described the new and novel method and preferred fixture embodiment of the present invention for sharpening helical cutting tools, it is realized that the concepts as are herein disclosed are susceptible to various modifications without departing from the scope of the invention as is defined in the claim.

Having thus fully described my invention what I claim is:

A method of sharpening the involute edges on the cutting teeth of a helical gear cutting tool by a rotatable grinding wheel, said method comprising the step of mounting the tool so as to be swingable about a vertical axis which is located directly vertically below the rotatable axis of said grinding wheel, the step of locating the cutting tool so that its center is spaced radially from said vertical axis a distance as determined by the equation $D=YBCR$, where D is the radial distance between the center of said cutting tool and said vertical axis, $y$ is a constant having a range of .9 to 1.1; and BCR is the base circle radius of said tool, the step of spacing a cutting edge of said tool at a distance $C_1$ from said vertical axis as determined by the equation $C_1 = a + .34$ addendum where the addendum is the addendum of the cutting teeth of said tool and $a$ is a finite value which may vary within the range of .400 to .450 inch, the step of locating a grinding surface of said grinding wheel which has a diameter determined by the equation $$\text{Wheel dia.} = WF \left\{ \text{adden.} + \frac{PD - BCD}{2} \right\}$$

at said distance $C_1$ from said vertical axis where adden. is the addendum of the cutting tool in inches; PD is the pitch diameter of the said tool in inches; BCD is the base circle diameter in inches of said tool; and WF is a multiplying factor as determined by the equation $$(WF+\alpha)^3 = 100\ DP$$

where $\alpha$ is a constant with a range of $\pm 1.2$; and DP is the diametral pitch, the step of presenting said cutting edge to said grinding surface by swinging said tool about said vertical axis, and the step of successively locating the remaining cutting edges of said tool at said distance $C_1$ from said vertical axis and successively presenting said remaining cutting edges to said grinding surface of said wheel.

References Cited in the file of this patent

UNITED STATES PATENTS

| | | |
|---|---|---|
| 2,108,239 | Sykes | Feb. 15, 1938 |
| 2,202,587 | Kitchen | May 28, 1940 |
| 2,536,864 | Strickland | Jan. 2, 1951 |
| 2,814,170 | Pfluger | Nov. 26, 1957 |
| 2,822,649 | Bruderick | Feb. 11, 1958 |
| 2,889,669 | Babbitt | June 9, 1959 |